(12) United States Patent
Panek

(10) Patent No.: US 7,631,497 B2
(45) Date of Patent: Dec. 15, 2009

(54) TURBINE HEAT SHIELD WITH RIBS

(75) Inventor: Edward Panek, Biltmore Lake, NC (US)

(73) Assignee: BorgWarner Inc., Auburn Hills, MI (US)

( * ) Notice: Subject to any disclaimer, the term of this patent is extended or adjusted under 35 U.S.C. 154(b) by 490 days.

(21) Appl. No.: 11/111,224

(22) Filed: Apr. 21, 2005

(65) Prior Publication Data
US 2006/0239841 A1    Oct. 26, 2006

(51) Int. Cl.
*F02B 33/44* (2006.01)
(52) U.S. Cl. ..................... 60/605.1; 60/605.3
(58) Field of Classification Search ............. None
See application file for complete search history.

(56) References Cited

U.S. PATENT DOCUMENTS

| | | | | |
|---|---|---|---|---|
| 3,106,381 A | * | 10/1963 | Leins | 415/119 |
| 3,661,477 A | * | 5/1972 | Westrum | 417/373 |
| 4,000,609 A | * | 1/1977 | Chute | 60/804 |
| 4,101,241 A | | 7/1978 | Kasuya | |
| 4,198,192 A | * | 4/1980 | Webb | 417/373 |
| 4,242,039 A | * | 12/1980 | Villard et al. | 415/112 |
| 4,355,850 A | * | 10/1982 | Okano | 384/121 |
| 4,613,281 A | * | 9/1986 | Lubieniecki | 415/171.1 |
| 4,613,288 A | | 9/1986 | McInerney | |
| 4,705,463 A | | 11/1987 | Joco | |
| 4,725,206 A | * | 2/1988 | Glaser et al. | 417/407 |
| 4,786,238 A | * | 11/1988 | Glaser et al. | 417/53 |
| 4,969,805 A | | 11/1990 | Romeo | |
| 5,026,260 A | | 6/1991 | Gutknecht et al. | |
| 5,087,176 A | * | 2/1992 | Wieland | 417/407 |
| 5,161,945 A | * | 11/1992 | Clevenger et al. | 415/177 |
| 5,214,920 A | | 6/1993 | Leavesley | |
| 5,231,831 A | | 8/1993 | Leavesley | |
| 5,233,824 A | * | 8/1993 | Clevenger | 60/805 |
| 5,295,300 A | * | 3/1994 | Garrick, Jr. | 29/888.021 |
| 5,297,928 A | * | 3/1994 | Imakiire et al. | 415/112 |
| 5,399,064 A | | 3/1995 | Church et al. | |
| 5,403,150 A | * | 4/1995 | McEachern et al. | 415/177 |

(Continued)

FOREIGN PATENT DOCUMENTS

EP        0 342 361 A1    11/1989

(Continued)

*Primary Examiner*—Thomas Denion
*Assistant Examiner*—Douglas J. Duff
(74) *Attorney, Agent, or Firm*—William Anderson; Stephan A. Pendorf; Patent Central LLC (57) ABSTRACT

A turbocharger (10) with a heat shield (60) positioned between the turbine wheel (30) and the bearing housing (20), wherein the heat shield defines a gap (70) between the turbine wheel (30). The heat shield (60) and is provided with at least one rib (80) extending into the gap. In this gap, in the case of a conventional flat heat shield, the turbine wheel backface may act in the manner of a centrifugal pumping, pumping gas out from within the gap, creating a region of reduced pressure adjacent the outboard side of the turbine shaft bearing, drawing oil out the shaft bearing and into the space between the turbine wheel backface and the heat shield. The inventive heat shield has raised structures designed to interfere with the rotational and centrifugal flow of gas in the gap between heat shield and turbine wheel backface, thus prevent oil bypass.

14 Claims, 5 Drawing Sheets

U.S. PATENT DOCUMENTS

| | | | |
|---|---|---|---|
| 5,441,383 A * | 8/1995 | Dale et al. | 415/158 |
| 5,743,707 A * | 4/1998 | Battig et al. | 415/113 |
| 5,755,445 A * | 5/1998 | Arora | 277/418 |
| 6,155,780 A * | 12/2000 | Rouse | 415/173.3 |
| 6,164,931 A | 12/2000 | Norton et al. | |
| 6,578,849 B2 * | 6/2003 | Haje | 277/389 |
| 6,644,667 B2 * | 11/2003 | Grondahl | 277/355 |
| 6,694,733 B1 * | 2/2004 | Bernardini et al. | 60/602 |
| 6,736,401 B2 * | 5/2004 | Chung et al. | 277/355 |
| 7,384,236 B2 * | 6/2008 | Meier et al. | 415/178 |
| 2004/0244372 A1 * | 12/2004 | Leavesley | 60/602 |

FOREIGN PATENT DOCUMENTS

| | | |
|---|---|---|
| EP | 0 956 435 B1 | 2/2004 |
| GB | 2 271 814 A | 4/1994 |

\* cited by examiner

TURBINE HEAT SHIELD WITH RIBS

TECHNICAL FIELD

The invention relates to a turbocharger heat shield. In addition to insulating the bearing housing and bearing from the heat of the turbocharger exhaust turbine, as is conventional, the inventive heat shield is modified to reduce hydrocarbon emissions.

BACKGROUND OF THE INVENTION

Turbochargers are in use in connection with large diesel engines as well as with smaller, passenger car power plants. The design and function of turbochargers is described in detail in the prior art, for example, U.S. Pat. Nos. 4,705,463, 5,399,064, and 6,164,931, the disclosures of which are incorporated herein by reference.

Turbocharger units typically include a turbine operatively connected to the engine exhaust manifold, a compressor operatively connected to the engine air intake manifold, and a shaft connecting the turbine wheel and compressor wheel so that the rapidly rotating turbine wheel drives the compressor wheel. The shaft extends through a bearing housing and is mounted for rotation in bearings. The bearings are most often free-floating bearings. Crankcase lubricant under pressure is pumped through the free floating bearings to lubricate the rotating bearing interfaces, as well as the thrust surfaces that limit axial excursions of the shaft.

In addition to performing the useful work as described above, turbochargers must be designed to combat two significant problems: first, oil should not be allowed to escape from the bearing housing into the turbine or compressor housing and from there into the environment, and second, the high temperature of the turbine must not be allowed to adversely affect the lubricating oil in the bearing housing.

More specifically, turbocharged vehicles are required to meet increasingly stringent emissions standards. It is a challenge to contain lubricant within the bearing housing, considering that lubricating oil is pumped in under pressure, at a high flow rate, to lubricate and remove heat from a turbine shaft which extends through the turbine housing and rotates at up to 350,000 rpm. Although barriers are set up in the turbocharger, some amount of the lubricant will escape from the bearing housing into either the turbine housing or the compressor housing. This lubricant is ultimately emitted into the environment via the exhaust, contributing to emissions.

Regarding the second mentioned problem, temperatures of about 740° C. occur in the exhaust gas turbine in the case of Diesel engines and about 1,000° C. in the case of Otto-cycle engines. The transfer of high temperatures from the turbine portion of the turbocharger to the bearing housing can lead to oxidation of the lubricating oil within the bearings and on the walls of the center housing.

It is known to use heat shields in order to protect the bearing housing from the high temperatures of the exhaust gas turbine. Heat shields are described for example in U.S. Pat. Nos. 4,613,288; 4,969,805; 5,026,260; 5,214,920; 5,231,831; and 5,403,150. According to conventional wisdom, the heat shield is a piece of metal in the shape of a flat disc interposed between turbine and bearing housing and able to withstand exposure to high temperatures.

While these heat shields effectively insulate the bearing housing from the high temperatures of the exhaust-gas turbine, the problem of oil bypass, particularly into the turbine housing, remains. One approach to cutting down on hydrocarbon emissions involved the re-design of turbocharger assemblies to allow lubrication and support of the bearings with a reduced amount of lubricant flow through the bearing housing. This resulted in significantly lower lubricant passage from the turbocharger into the engine or engine exhaust. However, as the flow rate of the lubricant is reduced, heat removal is reduced, and bearing housing temperatures increase, resulting in an increased tendency to coking, requiring countermeasures.

U.S. Pat. No. 4,101,241 (Kasuya) recognizes that the part of the turbine impeller near a seal ring tends to be subjected to a pressure much lower than the gas pressure at the turbine inlet, such that the lubricant to lubricate the seal ring tends to leak through the back surface of the turbine impeller towards the inside of the turbine casing and the parts joining the center housing and the turbine casing thereby causing fire hazards or forming carbon deposits therebetween to give bad influence on the supercharger itself. Kasuya addresses the problem by providing the heat shroud with a hole to permit communication between the inside and outside thereof. The pressure within the inside part of the shroud can be increased to about three times as high as the pressure within the center housing, or 300 to 600 mmAq. By making the pressure applied on the turbine side of the center housing higher than the pressure within the center housing, leakage of the lubricant through the seal ring to the turbine casing can be completely prevented. However, this small hole easily becomes clogged by soot, rendering the entire mechanism inoperative and the turbocharger liable to failure. Further, as the heat shield expands and contracts during thermal cycling, the clearance between heat shield and turbine housing varies, making control of the system difficult.

There thus remains a need for a simple measure which improves the containment of oil in the bearing housing without undesirable side effects.

SUMMARY OF THE INVENTION

The present invention is based on the discovery that by modifying the design of a heat shield in a way contrary to accepted wisdom, the heat shield can actually participate in preventing leakage of lubricant into the turbine housing.

Even more surprising is that the re-designed heat shield can be retrofitted to existing turbochargers, i.e., it can take the place of an existing heat shield without requiring any turbocharger modifications. The heat shield is simple in design and economical to manufacture, yet provides significant emissions control benefits.

After intensive research and consideration of the problems associated with conventional turbochargers, the inventor theorized that a peculiar effect might be occurring in the narrow gap between the stationary heat shield and the backface of the rapidly rotating turbine wheel. The inventor considered that at the high rotational speeds at which exhaust-gas turbines rotate, namely, in the order of from 100,000 to 350,000 RPM, any gases present in the narrow gap between the heat shield and the backface of the turbine wheel may be drawn along and by the turbine backface. The rapidly rotating backface may cause the gasses to rotate rapidly. As the gasses rotate rapidly, they are slung tangentially outward. Thus, in the conventional design, the turbine backface may act in the manner of a centrifugal pumping, pumping out gas from within the gap.

As gas in the gap is pumped out, this creates a vacuum, and accordingly pressure in the gap drops. Since this region of reduced pressure is adjacent the outboard side of the turbine shaft bearing, oil is drawn out the shaft bearing and into the space between the turbine wheel backface and the heat shield. From there, the oil is entrained in the exhaust gas and emitted to the environment.

Having first theorized that the migration of lubricant from the bearing housing into the turbine housing may be facilitated by the centrifugal pumping effect occurring in the gap between the turbine wheel backface and heat shield, the inventor then proceeded to provide a way to test this theory and to overcome this problem.

The inventor experimented with several techniques, and found that the centrifugal pumping effect did take place, and that a particularly simple, economical, yet highly effective way to "short circuit" the problem was to provide the heat shield with raised structures designed to interfere with the rotational and centrifugal flow of gas in the gap between heat shield and turbine wheel backface. These raised structures are sometimes referred to hereafter as "ribs", but in the context of the present invention this term is considered to include any similar structure such as a ridge, flange, vane, rim, lip, protuberance, extension, etc.

In accordance with the invention, the raised structures are shaped to at least reduce the centrifugal pumping action occurring in the gap between the turbine wheel backface and the prior art flat heat shield, and preferably, to completely cancel or even reverse the effect altogether.

Accordingly, the present invention concerns a heat shield provided with raised structures provided on the face of the heat shield. Based on the direction of rotation of the turbine wheel, and thus the direction in which the wheel drives the movement of the gas in the gap, the raised structures are designed to at least hinder the centrifugal "throwing out" of the gas, and preferably to counteract this flow of gas and to actually channel the flow of gas back towards the shaft. Channeling the flow of gas back towards the shaft creates a positive pressure at the outboard side of the shaft bearing, thereby reducing, if not completely preventing, oil leakage from the shaft bearing into the turbine housing. This is in contrast to conventional heat shields, which produce a negative pressure at the shaft and thus facilitate oil migration past the bearing and into the exhaust.

The present invention further relates to a turbocharger comprising:
- a turbine wheel housed in a turbine housing, the turbine wheel having a backface;
- a compressor wheel housed in a compressor housing;
- a shaft connecting said turbine wheel and said compressor wheel;
- a bearing housing in which said shaft is rotatingly journaled; and
- a heat shield positioned between said turbine wheel and said bearing housing and defining a gap between the turbine wheel and heat shield;
- wherein at least one raised surface is provided on said heat shield, said raised surface extending into said gap and adapted to interfere with flow of gas in said gap.

The ribs are simply configured to reduce the free flow of air in the gap between the backface of the turbine wheel and the heat shield when the turbine wheel is rotating.

The main difference between the heat shield according to the present invention and the heat shield of the prior art is the presence of ribs on the surface of the heat shield extending into the gap between the turbine wheel and the heat shield. The presence of the ribs in the gap as a minimum substantially interrupts or "short circuits" the free flow of air between the ribs breaking the pumping effect and increasing the gas pressure at the shaft.

The foregoing detailed description is intended to be illustrative and non-limiting. Many changes and modifications are possible in light of the above teachings. Thus, it is understood that the invention may be practiced than as otherwise specifically described herein and still be within the scope of the appended claims.

BRIEF DESCRIPTION OF THE DRAWINGS

For a more complete understanding of the nature and objects of the present invention, reference should be made to the following detailed description taken together with the accompanying drawings, in which.

DETAILED DESCRIPTION OF THE INVENTION

The present invention now will be described more fully hereinafter with reference to the accompanying drawings, in which some, but not all, embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

As already discussed, the general idea of using heat shields in order to protect the bearing housing from the high temperatures of the exhaust gas turbine is well known, and it is well within the skill of the art to fit a heat shield to a particular turbocharger design, as evidenced by, for example, U.S. Pat. Nos. 4,613,288; 4,969,805; 5,026,260; 5,214,920; 5,231,831; and 5,403,150.

According, the present specification will not be burdened by a detailed description of the conventional heat shield, but will focus on the distinguishing feature of the present invention, namely, the design and provision of raised surfaces.

That is, according to conventional wisdom the functional surface of a heat shield is a flat disc simply interposed between turbine and bearing housing and able to withstand exposure to high temperatures. The present invention provides a heat shield with, instead of a flat surface facing the turbine wheel, raised structures on the face of the heat shield. Based on the direction of rotation of the turbine wheel, and thus the circular-spiral direction in which the wheel drives the movement of the gas in the gap, the raised structures are designed to at least hinder the centrifugal "throwing out" of the gas, and preferably to counteract this flow of gas and to actually divert or channel the flow of gas back towards the shaft.

The principle underlying the present invention will now be explained.

As the turbine wheel begins to rotate in a clockwise direction (the present invention works equally well in either direction of rotation, thus "clockwise" is used merely as an example) any gas in the gap is drawn along. Since the turbine wheel rotates, the gas is initially caused to rotate, but since gas is fluid and wants to move linearly and not in a curve it is not restrained in the gap and moves out of the gap. This system operates in the manner of a centrifugal pump.

The present inventor considered that the centrifugal pump action might be interfered with if structures were provided I the gap between turbine wheel and heat shield. The structures should at least reduce the centrifugal action, and preferably completely prevent or, as with an impeller, even cause air to flow radially inward rather than outward.

Channeling the flow of gas back towards the shaft creates a positive pressure at the outboard side of the shaft bearing, thereby reducing, if not preventing, oil leakage from the shaft bearing into the turbine housing. This is in contrast to conventional heat shields, which produce a negative pressure at the shaft and thus facilitate oil migration into the exhaust.

The turbine wheel comprises a hub including a disc part having a front face supporting multiple blades and a backface. The heat shield is preferably located adjacent the backface of the turbine wheel.

The shape of the ribs may be any shape as used for example in a compressor diffuser having fixed vanes.

In a first embodiment of the invention, the ribs have a straight shape radiating out from the center of the heat shield.

In a second embodiment of the present invention, the ribs have a curved shape.

Figure 7:
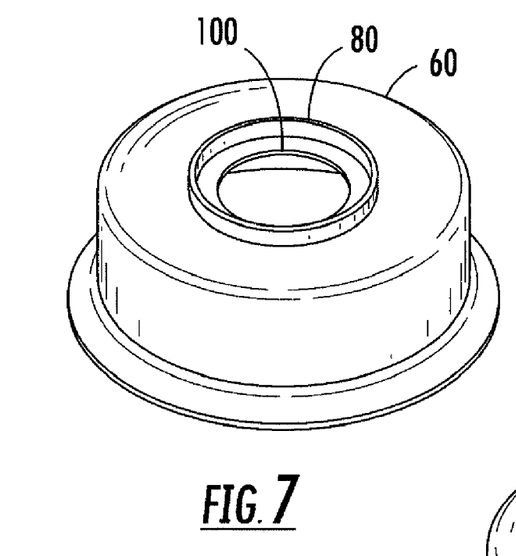
FIG. 7 shows a heat shield according to a third embodiment of the present invention.

In a less preferred embodiment of the invention, the ribs have a circular shape concentric with the center of the heat shield, as is shown in FIG. 7.

Figure 9:
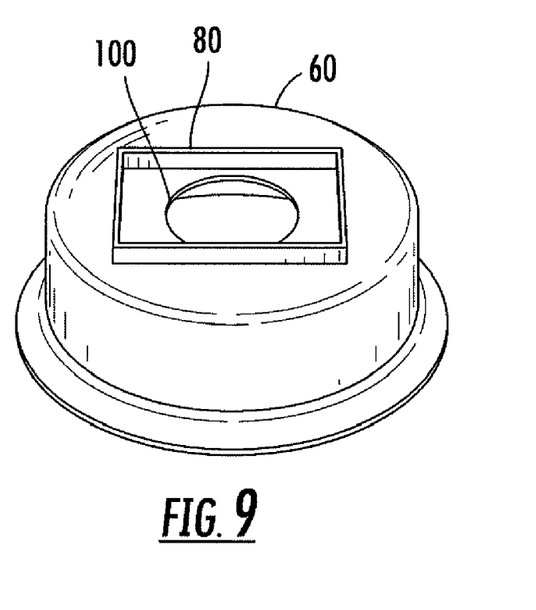
FIG. 9 shows a heat shield according to a fifth embodiment of the present invention.
Figure 10:
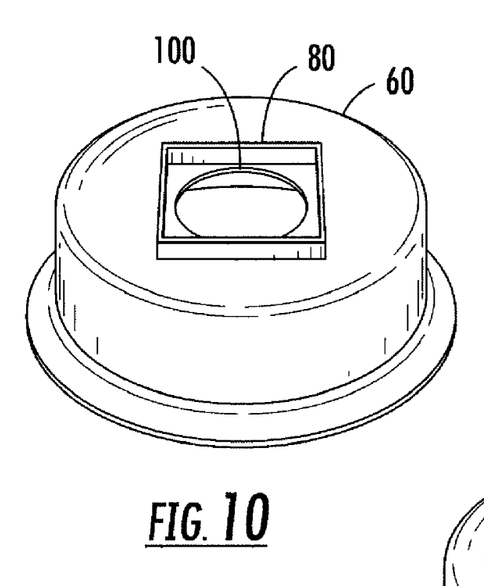
FIG. 10 shows a heat shield according to a sixth embodiment of the present invention.

In another less preferred embodiment of the present invention, the ribs may have a triangular (see FIG. 8) or rectangular (see FIG. 9) or square (see FIG. 10) shape centered about the center of the heat shield.

The heat shield, according to the present invention, may be a machined shield or a stamped shield.

Furthermore, the present invention contemplates a method of preventing a lubricant leak in a turbocharger comprising the steps of:

a) providing a turbocharger comprising:
  a turbocharger housing including a compressor housing, a bearing housing and a turbine housing;
  a turbine wheel located in said turbine housing;
  a compressor wheel located in said compressor housing;
  a shaft extending through the bearing housing and connecting the turbine wheel and the compressor wheel;
b) positioning a heat shield between the turbine wheel and the bearing housing defining a gap between the turbine wheel and the heat shield; and
c) providing at least one rib on the heat shield, wherein the at least one rib extends into said gap;
wherein said at least one rib reduces the free flow of air in said gap when said turbine wheel is rotating.

Figure 1:
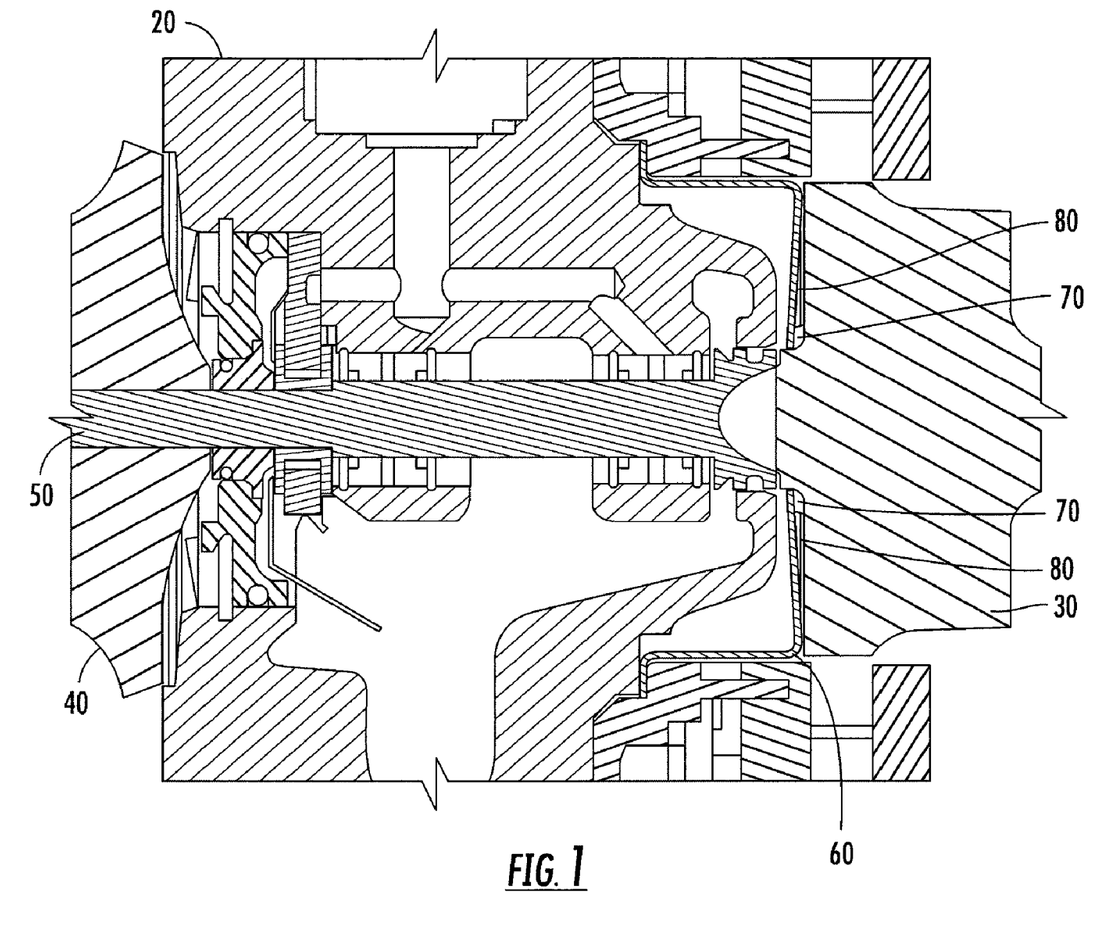
FIG. 1 shows a side cross sectional view of a turbocharger employing a heat shield according to the present invention.

FIG. 1 shows a side cross sectional view of a turbocharger employing a heat shield according to the present invention. The turbocharger 10 comprising:
  a turbocharger housing (not shown) including a compressor housing (not shown), a bearing housing 20 and a turbine housing (not shown);
  a turbine wheel 30 located in said turbine housing;
  a compressor wheel 40 located in said compressor housing;
  a shaft 50 extending through the bearing housing 20 and connecting the turbine wheel 30 and the compressor wheel 40;
  a heat shield 60 positioned between the turbine wheel 30 and the bearing housing 20 and defining a gap 70 between the turbine wheel 30 and heat shield 60;
  at least one rib 80 on the heat shield extending into said gap.

Figures 2, 3, 4, 5, 6:
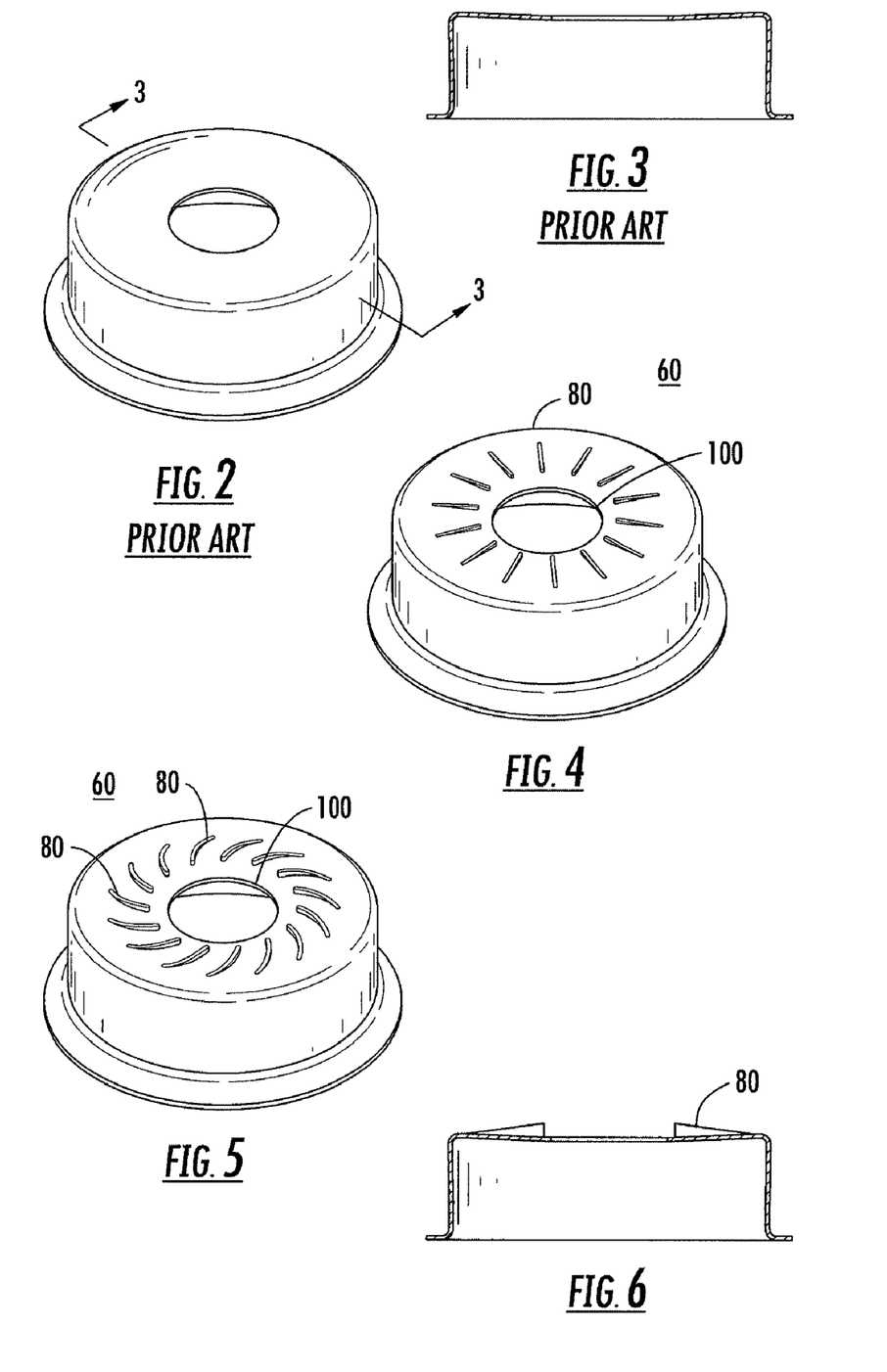
FIG. 2 shows a stamped heat shield according to the prior art.
FIG. 3 shows a cross sectional view of the heat shield according to FIG. 2 taken over the plane 3-3.
FIG. 4 shows a stamped heat shield according to the first preferred embodiment of the present invention.
FIG. 5 shows a stamped heat shield according to the second preferred embodiment of the present invention.
FIG. 6 shows a cross sectional view of the heat shield according to FIG. 4 taken over the plane 4-4.

The present invention can be understood from a comparison between the heat shield of the present invention with the heat shields of the prior art. FIG. 2 shows a heat shield according to the prior art. FIGS. 4 and 5 show respectively the first and second preferred embodiments of the heat shield according to the present invention.

The main difference between the heat shield according to the present invention (FIGS. 4-5) and the heat shield of the prior art (FIG. 2) is the presence of ribs 80 on the surface of the heat shield that extend into the gap 70 between the turbine wheel 30 and the heat shield 60.

The presence of the ribs 80 in the gap 70 reduces the free flow of air in the gap when the turbine is rotating by trapping the air between the ribs, thus the swirling movement of the air is prevented. Preventing the swirling movement of the air avoids the air to be thrown tangentially outward, thus the centrifugal pumping effect is prevented.

Basically, the turbine wheel comprises a hub including a disc part having a front face supporting multiple blades and a backface. The present invention preferably locates the heat shield adjacent to the backface of the turbine wheel.

The heat shield 60 of the present invention preferably has a general cup-shaped configuration with a circumferential rim 65 and a central opening 100. The design of the present invention is not limited to the cup-shaped configuration. The heat shield may be of any other desirable shape such as a disk shape.

In the first preferred embodiment of the present invention, the ribs 80 have a straight shape (FIG. 4). In this embodiment, the ribs are arranged like rays uniformly around the central opening 100 of the shield.

FIG. 5 shows the second preferred embodiment of the present invention. In this embodiment, the ribs have a curve or c-shaped, with the curved portion extending generally radially outward from the central opening 100 of the heat shield. The advantage of this design is that the curve shape directs the gases, present in the gap between the backface of the turbine wheel and the heat shield, at an appropriate angle towards the shaft. Thus, higher pressure may be created at the shaft preventing the movement of lubricant into the turbine housing.

Figure 8:
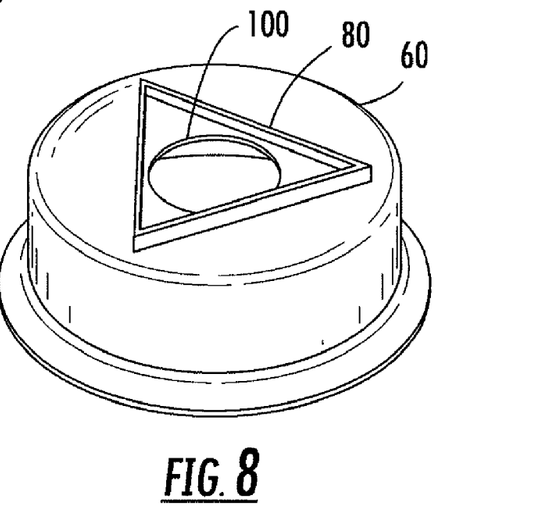
FIG. 8 shows a heat shield according to a fourth embodiment of the present invention.
Figure 11:
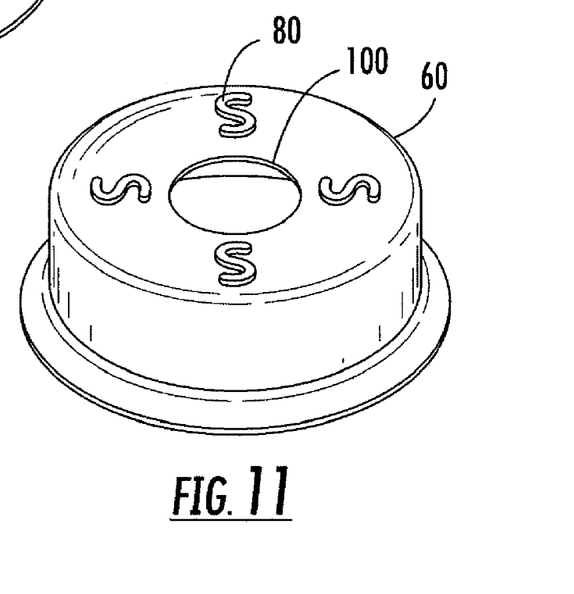
FIG. 11 shows a heat shield according to a seventh embodiment of the present invention.

The at least one rib may have a circular shape (see FIG. 7), a triangular shape (see FIG. 8, a rectangular or square shape (see FIGS. 9 and 10), or an S-shape (see FIG. 11).

Figure 12:
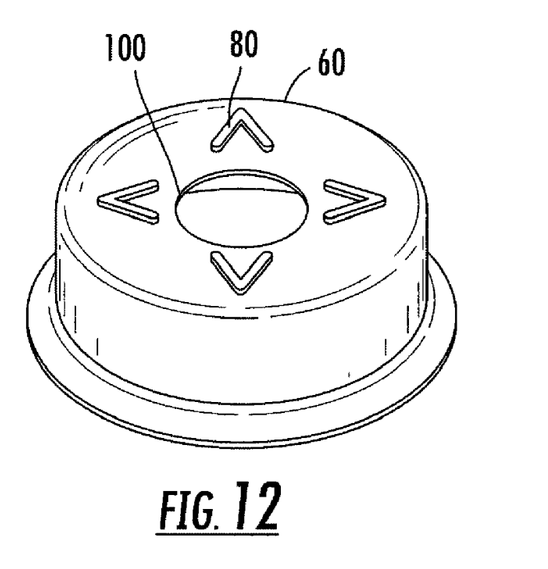
FIG. 12 shows a heat shield according to a eighth embodiment of the present invention.

Having triangular (see FIG. 8), rectangular (see FIGS. 9 and 10), s-shaped (see FIG. 11), v-shaped (see FIG. 12), or circular (see FIG. 7) shaped ribs helps reduce the pumping effect by partially cutting the swirling motion of the air in the gap between the backface of the turbine and the bearing housing. If the swirling motion of air is only partially interrupted, then these designs do not completely prevent the leaking of lubricant into the turbine housing because of a small swirling motion is still created. Accordingly, it is more preferred to take advantage of the swirling motion to create a counter-centrifugal pumping action, i.e., an impeller motion wherein gas is drawn radially inward rather than being pumped centrifugally radially outward.

The heat shields, according to the present invention, may be a stamped or machined shield. Machined heat shields are more expensive than stamped heat shields. Thus, the shield of the present invention is preferably a stamped shield in order to reduce the cost. The heat shield 60 can be stamped from a metal such as stainless steel or another more suitable substance.

In having at least one rib 80 that extends into the gap 70 created between the turbine wheel 30 and the heat shield 60 provides an improvement over the heat shield of the prior art because in addition to protecting the central housing from thermal damage, the heat shield of the present invention eliminates the possibility of lubricant leaks into the turbine housing.

The heat shield, according to the present invention, is cost-effective and highly reliable.

Figure 13:
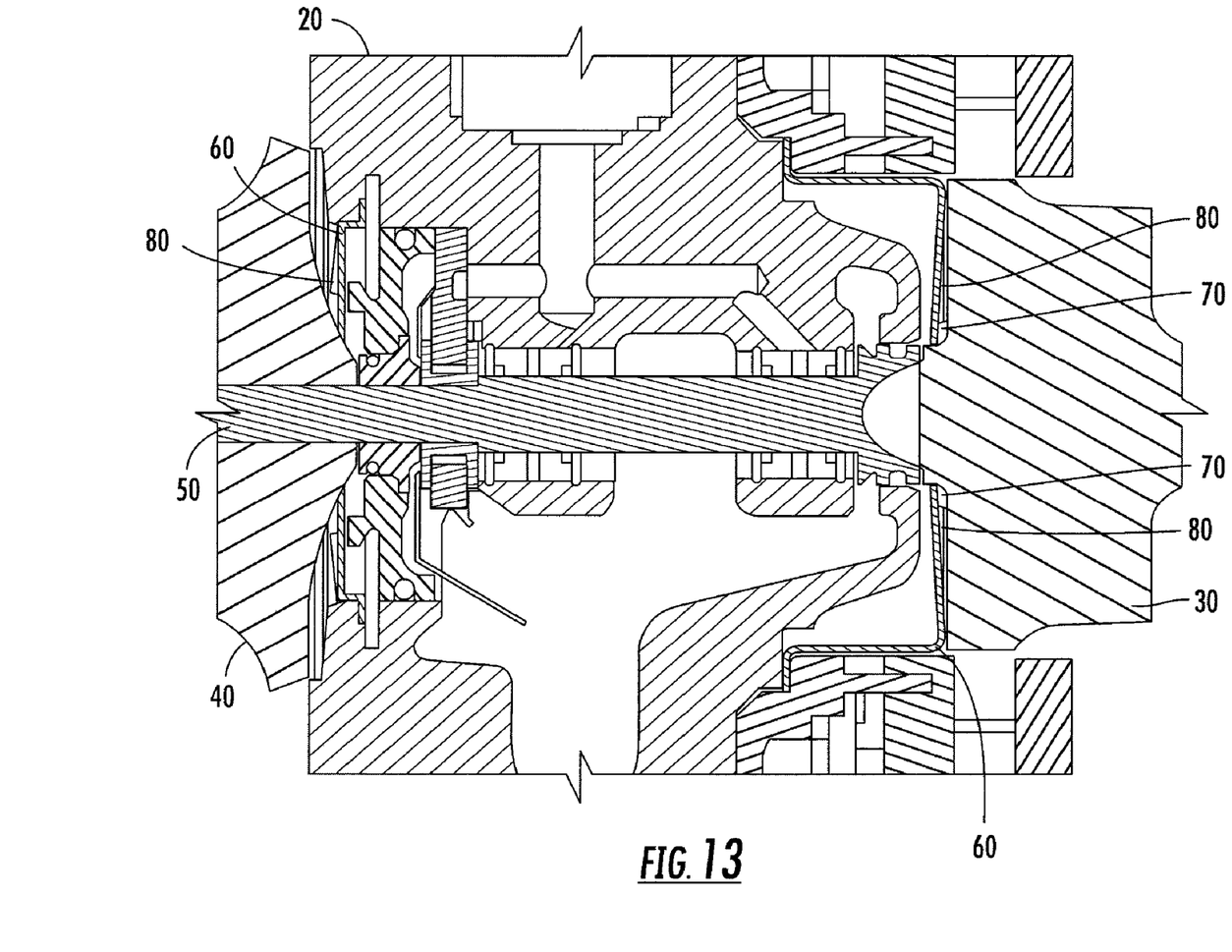
FIG. 13 shows a side cross sectional view of a turbocharger employing two heat shields according to the present invention, one of the heat shields positioned between the compressor wheel and the bearing housing.

Furthermore, the heat shield of the present invention can be used in conjunction with a compressor wheel to prevent the leakage of lubricant to the compressor housing, as shown in FIG. 13.

Finally, the present invention contemplates a method of preventing a lubricant leak in a turbocharger comprising the steps of:
a) providing a turbocharger comprising:
   a turbocharger housing including a compressor housing, a bearing housing and a turbine housing;
   a turbine wheel located in said turbine housing;
   a compressor wheel located in said compressor housing;
   a shaft extending through the bearing housing and connecting the turbine wheel and the compressor wheel;
b) positioning a heat shield between the turbine wheel and the bearing housing defining a gap between the turbine wheel and the heat shield; and
c) providing at least one rib on the heat shield, wherein the at least one rib extends into said gap;
   wherein said at least one rib reduces the free flow of air in said gap when said turbine wheel is rotating.

Many modifications and other embodiments of the invention set forth herein will come to mind to one skilled in the art to which this invention pertains, having the benefit of the teachings presented in the foregoing descriptions and the associated drawings. Therefore, it is to be understood that the invention is not to be limited to the specific embodiments disclosed, and that modifications and other embodiments are intended to be included within the scope of the appended claims. Although specific terms are employed herein, they are used in a generic and descriptive sense only, and not for purposes of limitation.

What is claimed is:

1. A turbocharger (10) comprising:
   a turbocharger housing including a compressor housing, a bearing housing (20), and a turbine housing;
   a turbine wheel (30) located in said turbine housing, wherein said turbine wheel comprises a hub including a disc part, wherein the disk part has a) a front face supporting multiple blades and b) a backface;
   a compressor wheel (40) located in said compressor housing;
   a shaft (50) extending through the bearing housing (20) and connecting the turbine wheel (30) and the compressor wheel 40;
   a heat shield (60) positioned between the turbine wheel (30) and the bearing housing (20) and defining a gap (70) between the backface of the turbine wheel (30) and heat shield (60);
   at least one rib (80) on the heat shield and extending from the heat shield into said gap and towards said backface of said turbine wheel, interfering with the rotational and centrifugal flow of gas in the gap between the heat shield and the turbine backface when the turbine wheel is rotating.

2. The turbocharger of claim 1, wherein said at least one rib is configured to cause air to flow radially inward towards the shaft rather than outward, creating a positive pressure at the outboard side of the shaft bearing, thereby reducing or preventing oil leakage from the shaft bearing into the turbine housing.

3. A turbocharger (10) comprising:
   a turbocharger housing including a compressor housing, a bearing housing (20), and a turbine housing;
   a turbine wheel (30) located in said turbine housing, wherein said turbine wheel comprises a hub including a disc part, wherein the disk part has a) a front face supporting multiple blades and b) a backface;
   a compressor wheel (40) located in said compressor housing;
   a shaft (50) extending through the bearing housing (20) and connecting the turbine wheel (30) and the compressor wheel 40;
   a heat shield (60) positioned between the turbine wheel (30) and the bearing housing (20) and defining a gap (70) between the backface of the turbine wheel (30) and heat shield (60);
   at least one rib (80) on the heat shield and extending from the heat shield into said gap and towards said backface of said turbine wheel, wherein the at least one rib has a straight shape, a triangular shape, a rectangular shape, or a square shape.

4. The turbocharger according to claim 1, wherein the at least one rib has a curved shape.

5. The turbocharger according to claim 1, wherein the at least one rib has a circular shape and is located generally concentric to the shaft (50).

6. The turbocharger according to claim 1, wherein the at least one rib has a triangular shape.

7. The turbocharger according to claim 1, wherein the at least one rib has a rectangular or square shape.

8. The turbocharger according to claim 1, wherein the at least one rib has a S-shape or v-shape.

9. The turbocharger of claim 1, wherein the heat shield including ribs is a stamped shield.

10. The turbocharger of claim 1, wherein the heat shield has at least two ribs, and wherein the at least two ribs are radially arranged around a central opening (100) of the shield.

11. The turbocharger of claim 1, wherein the heat shield is positioned between the compressor wheel and the bearing housing.

12. A method of preventing a lubricant leak in a turbocharger comprising the steps of:
    a) providing a turbocharger comprising:
       a turbocharger housing including a compressor housing, a bearing housing, and a turbine housing;
       a turbine wheel located in said turbine housing, said turbine wheel comprising a hub including a disc part, wherein the disk part has a) a front face supporting multiple blades and b) a backface;
       a compressor wheel located in said compressor housing;

a shaft extending through the bearing housing and connecting the turbine wheel and the compressor wheel;

b) positioning a heat shield between the turbine wheel and the bearing housing, wherein a gap is defined between the backface of the turbine wheel and the heat shield; and c) providing at least one rib on the heat shield, wherein the at least one rib extends into said gap and towards said backface of said turbine wheel;

wherein said at least one rib interferes with the rotational and centrifugal flow of gas in the gap between the heat shield and the turbine backface when the turbine wheel is rotating, causing air to flow radially inward towards the shaft rather than outward, creating a positive pressure at the outboard side of the shaft bearing, thereby reducing or preventing oil leakage from the shaft bearing into the turbine housing.

13. The method according to claim 12 wherein the at least one rib has a shape chosen from straight shape, curved shape, circular shape, triangular shape, rectangular shape, square shape, V-shape, or S-shape.

14. The method according to claim 12 wherein the at least one rib causing air to flow radially inward towards the shaft rather than outward, creating a positive pressure at the outboard side of the shaft bearing, thereby reducing or preventing oil leakage from the shaft bearing into the turbine housing.

* * * * *